(12) United States Patent
Koch et al.

(10) Patent No.: US 8,638,083 B2
(45) Date of Patent: Jan. 28, 2014

(54) CONTROL FOR AN ELECTRICALLY ADJUSTABLE PIECE OF FURNITURE

(75) Inventors: Walter Koch, Schwanberg (AT); Mario Schenk, Bad Gams (AT)

(73) Assignee: LOGICDATA Electronic & Software Entwicklungs GmbH, Deutschlandsberg (AT)

( * ) Notice: Subject to any disclaimer, the term of this patent is extended or adjusted under 35 U.S.C. 154(b) by 349 days.

(21) Appl. No.: 13/127,569

(22) PCT Filed: Nov. 9, 2009

(86) PCT No.: PCT/EP2009/064857
§ 371 (c)(1),
(2), (4) Date: Aug. 3, 2011

(87) PCT Pub. No.: WO2010/055016
PCT Pub. Date: May 20, 2010

(65) Prior Publication Data
US 2012/0033449 A1 Feb. 9, 2012

(30) Foreign Application Priority Data

Nov. 12, 2008 (DE) .......................... 10 2008 056 914

(51) Int. Cl.
*H02M 1/36* (2007.01)
(52) U.S. Cl.
USPC .......................................... 323/288; 323/901
(58) Field of Classification Search
USPC .................. 323/238, 282–288, 351, 901, 908
See application file for complete search history.

(56) References Cited

U.S. PATENT DOCUMENTS

| | | | |
|---|---|---|---|
| 6,449,180 B1 | 9/2002 | Yang et al. | |
| 6,756,773 B2 * | 6/2004 | Koretsky et al. | 323/234 |
| 6,903,945 B2 | 6/2005 | Kitano | |
| 6,998,829 B2 * | 2/2006 | Solie | 323/288 |
| 7,592,792 B2 * | 9/2009 | Ryu et al. | 323/284 |
| 2003/0165068 A1 | 9/2003 | Tomonaga | |
| 2004/0042239 A1 | 3/2004 | Kitano | |
| 2006/0061299 A1 * | 3/2006 | Urakabe et al. | 315/291 |
| 2006/0197473 A1 * | 9/2006 | Fukuwa | 315/308 |
| 2008/0012516 A1 | 1/2008 | Ctvrtnicek | |

FOREIGN PATENT DOCUMENTS

| | | |
|---|---|---|
| DE | 100 50 380 A1 | 6/2001 |
| DE | 101 96 155 T1 | 8/2003 |
| DE | 102 05 706 A1 | 8/2003 |
| DE | 20 2006 010 135 U1 | 12/2007 |
| DE | 10 2006 053 353 A1 | 5/2008 |
| EP | 0085219 A2 | 8/1983 |
| GB | 2 356 498 A | 5/2001 |
| JP | 2000-224844 A | 8/2000 |

* cited by examiner

*Primary Examiner* — Jessica Han
(74) *Attorney, Agent, or Firm* — Slater & Matsil, L.L.P.

(57) ABSTRACT

A control module includes a control unit that is configured to control an electrically adjustable item of furniture, and a switched mode power supply that is configured to supply the control unit. The control unit and power supply are integrated into a common housing. The switched mode power supply is configured to be switched to an idle operating state depending on a ready signal. The switched mode power supply includes, in a second stage, a switched mode regulator component, the supply voltage of which is made available in the idle operating state by a starting circuit in a clocked manner. The starting circuit has an energy store and a resistive element. The energy store and the resistive element are dimensioned so that, in the idle operating state, an interval for charging the energy is longer than an interval for discharging the energy store by the switched mode regulator component.

12 Claims, 4 Drawing Sheets

CONTROL FOR AN ELECTRICALLY ADJUSTABLE PIECE OF FURNITURE

This patent application is a national phase filing under section 371 of PCT/EP2009/064857, filed Nov. 9, 2009, which claims the priority of German patent application 10 2008 056 914.3, filed Nov. 12, 2008, each of which is incorporated herein by reference in its entirety.

TECHNICAL FIELD

The invention relates to a control with a control part designed for controlling an electrically adjustable piece of furniture and with a switch-mode power supply.

BACKGROUND

Electrically adjustable pieces of furniture are being offered more and more. For example, in the case of many desks, especially in the case of writing desks, the height of the desk surface is electrically adjustable by means of a special drive. Also beds, for example, adjustable beds or hospital beds, could be set by means of electrical drives, for example, in height or inclination angle of the bed.

Here, for the driving of the electrical adjustment device, it is possible to use direct-current motors that are operated with a low voltage. For this purpose, the mains voltage is stepped down, for example, by a transformer into the lower voltage range of the direct-current motors and converted into a direct-current voltage by means of a rectifier circuit. The control of the direct-current motors is performed in an associated control through a controlled connection of the motors to the direct-current voltage. As an alternative to the transformer, such a control could also be supplied with the required direct-current voltage by a switch-mode power supply.

Another possibility for driving of an electrically adjustable piece of furniture lies in the use of one or more alternating-current motors for which a control is likewise provided. In this case, for the control, the mains alternating-current voltage is transformed down into a lower alternating-current voltage range, in order to connect the alternating-current motors to the down-transformed alternating-current voltage in a controlled way. Alternately, for controlling the alternating-current motors, an alternating-current voltage could be derived from a direct-current voltage that is provided by means of an external switch-mode power supply.

For the use of an external switch-mode power supply, it is necessary to attach the control and switch-mode power supply separately or each individually, that is, with a higher production expense, to the adjustable piece of furniture.

The production expense and the operating costs of a control are also influenced by the power requirements of the control.

Transformers for stepping-down the mains alternating-current voltage typically have, due to the required power, such spatial requirements that an integration of the transformers in a housing together with a control causes large housing sizes. Such structural sizes, however, could make the arrangement or fastening of a control on a piece of furniture to be adjusted more difficult and cause high costs.

SUMMARY OF THE INVENTION

Embodiments of the invention provide an economical control for an electrically adjustable piece of furniture.

In the case of an example embodiment of a control, a control part that is designed for controlling an electrically adjustable piece of furniture and a switch-mode power supply that supplies the control part are integrated into a common housing of the control, wherein the switch-mode power supply is designed to be switched into an idle operating state as a function of a ready signal.

Through the integration of the control part and the switch-mode power supply in a common housing of the control, material costs, among other things, can be saved. For example, a switch-mode power supply that is adapted, for example, in its power to the requirements of the control can be realized in a smaller construction than a corresponding transformer with comparable power. Accordingly, the housing of the control that also holds the switch-mode power supply can also be constructed smaller than for conventional solutions. Such a housing can thus also be attached more easily and better, from a visual perspective, to an adjustable piece of furniture.

In this way, because the switch-mode power supply can be switched by the ready signal into an idle operating state, the average power requirements of the control, in particular, of the switch-mode power supply, can be reduced. This reduces, among other things, the operating costs of the control. In addition, however, the switch-mode power supply could also be designed for a smaller continuous power, which reduces the production expense and the costs of the switch-mode power supply. In particular, the ready signal is constructed as a logical signal.

Advantageously, the switch-mode power supply is designed to output a direct-current voltage that can be used by the control part for generating at least one output voltage of the control. The output voltage of the control is here typically fed to one or more electric motors that can both be constructed as direct-current motors or as alternating-current motors.

The switch-mode power supply has a first and a second stage, wherein the first stage is designed to generate an intermediate voltage from a mains voltage applied to the switch-mode power supply on the input side. The second stage is accordingly designed to generate the direct-current voltage from the intermediate voltage in the switched mode. To this end, the second stage comprises a switch-mode regulator.

The switch-mode power supply could be operated in a normal operating state and in an idle operating state. In the normal operating state, the switch-mode power supply outputs a supply voltage for the control part. In the idle operating state, only a voltage with a lower load capacity or even no voltage is output by the switch-mode power supply. For example, the second stage has a switch-mode regulator component for generating the direct-current voltage that controls the switched mode for generating the direct-current voltage from the intermediate voltage. The switch-mode power supply is here designed to provide a supply voltage in a clocked manner for the switch-mode regulator component in the idle operating state by a start-up circuit and to provide a supply voltage continuously in the normal operating state by an operating supply circuit.

Thus, in the idle operating state, a control of switching processes in the second stage is turned off, so that in the case of not-needed output direct-current voltage, the appearance of a loss of power due to unnecessary switching processes is minimized. Due to the clocked supply of the switch-mode regulator component, however, the switch-mode power supply is located in a state that allows a quick change in the normal operating state in which corresponding power is provided on the output of the switch-mode power supply.

For example, the start-up circuit is designed to derive the supply voltage for the switch-mode regulator component from the intermediate voltage that is provided by the first stage. To this end, the start-up circuit has an energy storage device and a resistance element. The energy storage device and the resistance element are here dimensioned such that, in the idle operating state, a time span for charging the energy storage device is greater than a time span for discharging the energy storage device through the switch-mode regulator component. In other words, in the idle operating state, a voltage supply of the switch-mode regulator component is realized by means of the energy storage device. This is charged by means of the resistance element that is advantageously selected to be high impedance, wherein a defined charging current is produced by a resistance value of the resistance element. The current that is needed during the operation or the initialization of the switch-mode regulator component and is drawn from the energy storage device is higher than the charging current, so that the energy storage device is discharged more quickly than it is charged through the resistance element by means of the intermediate voltage. Through the charging and discharging of the energy storage device, a clocked operation of the switch-mode regulator component is produced.

In one embodiment, the operating supply circuit is designed to derive the supply voltage for the switch-mode regulator component from an auxiliary voltage in the second stage. For example, this auxiliary voltage is generated merely in the switched mode of the second stage, so that the supply voltage is not made available by the operating supply circuit in the idle operating state. In addition, the operating supply circuit can be deactivated, for example, as a function of the ready signal. In this case, as a function of the ready signal, the supply voltage for the switch-mode regulator component could also not be made available when the mentioned auxiliary voltage is present in the switched mode of the second stage.

In one special embodiment, the ready signal can be fed to the operating supply circuit by means of an optocoupler. Thus, a galvanic separation of the operating supply circuit from a circuit part can be achieved in that the ready signal is generated, processed, or forwarded. For example, the ready signal is generated by the control part as a function of a load state. This could then be the case, for example, when the control part has no power requirements for controlling, for example, a motor.

In another embodiment, the ready signal is generated by the second stage as a function of a value of the direct-current voltage. For example, it could be detected whether the direct-current voltage exceeds a predetermined value, so that, in this case, another generation of the direct-current voltage that is too high is prevented by the changeover into the idle operating state.

In one embodiment, the second stage comprises a transformer whose windings are designed for a short-term loading. For example, the transformer is connected on the primary side to corresponding switching means that transform the intermediate voltage as a function of a control by the switch-mode regulator component. On the secondary side of the transformer, the direct-current voltage to be output is generated. In this way, because no switching operation takes place in the idle operating state and the transformer therefore remains unloaded, the transformer can be dimensioned so that high currents can be processed by the transformer in a short time. Heating of the transformer associated with this process is justifiable due to the cooling possible in the idle phases.

For example, the transformer has a relatively low number of windings, wherein a diameter of the windings is selected relatively large, each with respect to a conventional transformer of a switch-mode power supply. Therefore, the transformer has a low inductance that causes a higher magnetization current and thus higher core losses that would be unfavorable for continuous operation. In the case of a conventional switch-mode power supply, a magnetization current also flows in the transformer when, secondarily, no current is drawn. In this case, the transformer would also heat up in no-load operation. Due to the idle operating state, however, the transformer can be cooled sufficiently.

In one embodiment of the transformer, the winding wire diameter of the transformer increases due to parallel switching of several thin wires. This leads to improved power distribution in the windings, because a single wire with a larger winding wire diameter could be loaded non-uniformly due to the current displacement for the frequencies that appear.

In one special embodiment, the first stage is designed to assume a first or at least one second operating mode, wherein, in the first and the at least one second operating mode, the intermediate voltage is generated from the mains voltage in different ways. For example, for the generation of the intermediate voltage in the first operating mode, a full-wave rectification of the mains voltage applied on the input side is performed, and in the at least one second operating mode, a half-wave rectification is performed.

In the case of a full-wave rectification, the intermediate voltage is produced in a known way essentially from the voltage amplitude of the mains alternating-current voltage. In the case of a half-wave rectification, a voltage doubling is performed based on the amplitude of the mains alternating-current voltage. In order to be able to switch between the at least two operating modes, a corresponding switching means is provided in the first stage of the switch-mode power supply.

For example, a changeover between the first and the at least one second operating mode is performed as a function of a voltage value of the mains voltage. For a higher mains voltage of circa 230 V that is typical in European areas, the operating mode could be selected, for example, with full-wave rectification, in order to obtain a defined intermediate voltage at the output of the first stage of the switch-mode power supply. For the presence of a lower mains voltage of, for example, 115 V, as is provided, for example, on the North American continent, the second operating mode could be selected in which a voltage doubling is performed by means of a half-wave rectification, in order to obtain an intermediate voltage corresponding to the first operating mode. Thus, as a function of a voltage value of each mains voltage, each of the operating modes could be selected in which intermediate voltages could be generated in the same voltage range. Such a control could therefore be used with the adjustable piece of furniture essentially independent of the voltage value of an available mains voltage.

In another embodiment of the control, the switching means has a detection device, a control device, and a switch for selecting the operating mode. The detection device is designed for the detection of at least one voltage range of the mains voltage set by a reference value. Accordingly, the control device could generate a control signal as a function of the at least one detected voltage range. The operating mode is selected by the switch as a function of the control signal generated by the control device.

In this embodiment, accordingly, the suitable operating mode is derived automatically from the available mains voltage. While the selection of the operating mode could also be performed by hand in various embodiments, in this embodiment, the risk of an incorrect operation or incorrect setting is reduced. A voltage supply of the switching means could be performed by the second stage or from the second stage. For example, in particular, a voltage supply for the detection device and/or the control device could be performed from a circuit part of the second stage of the switch-mode power supply provided especially for this purpose.

In another embodiment of a control, this has an operating part that forms an integrated unit with the switch-mode power supply and the control part. For example, through the smaller construction of the control it could be possible to attach this, for example, underneath a desk edge so that only the operating part integrated with the switch-mode power supply and the control part is accessible for a user of the adjustable piece of furniture. This means a further reduction of the assembly expense, because the operating part and the housing of the control no longer have to be mounted separately on the piece or pieces of furniture and work for laying a connection cable between the control and operating part can be eliminated.

Advantageously, the operating part is mounted on the housing of the control by means of a snap connection or a screw connection. In other words, the operating part could be connected purely mechanically to the housing of the control. This allows an especially simple construction of the operating part, because this contains no electrical parts, such as a plug or a switch. The operating part is therefore produced in an especially economical way from plastic, for example, as an injection-molded part.

BRIEF DESCRIPTION OF THE DRAWINGS

The invention will be explained in detail below using embodiments with reference to the figures. Elements with identical functions or effects here carry identical reference symbols.

DETAILED DESCRIPTION OF ILLUSTRATIVE EMBODIMENTS

Figure 1:
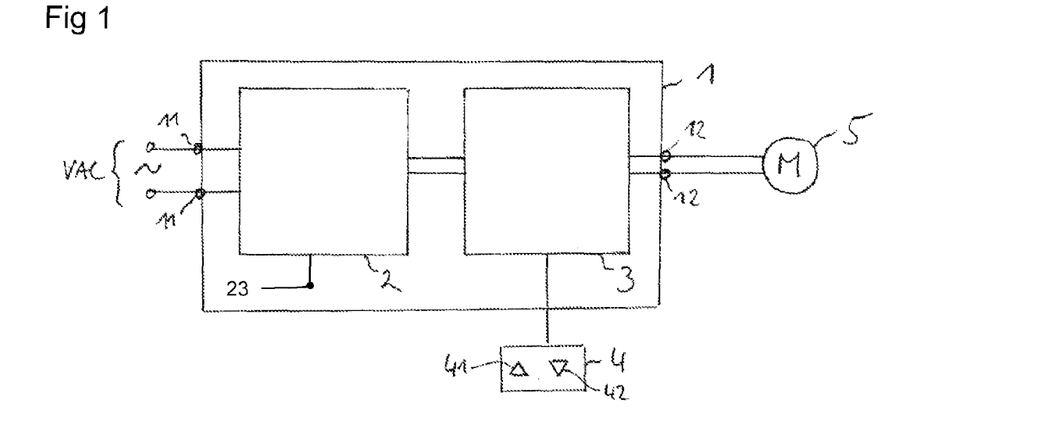
FIG. 1, shows an embodiment of a control according to the invention.

FIG. 1 shows an embodiment of a control for an electrically adjustable piece of furniture. The control comprises a housing 1 in which a switch-mode power supply 2 and a control part 3 are provided. The switch-mode power supply 2 is connected on the input side to a mains connection VAC by means of input connections 11. On the output side, the control part 3 is connected to the switch-mode power supply 2, wherein this control part is coupled at its output to output connections 12 of the housing 1. The switch-mode power supply 2 has a control input 23 on which a ready signal can be supplied for the control into an idle operating state. The ready signal could be provided by the control part 3 in various constructions and/or could be generated in the switch-mode power supply 2 itself and/or could be supplied externally. In this embodiment, a motor 5 that can cause an adjustment of the adjustable piece of furniture is connected to the output connections 12. Furthermore, an operating part 4 that has operating elements 41, 42 is connected to the control part 3.

Due to the switch-mode power supply 2, a mains alternating-current voltage applied to the mains connection VAC could be converted into a typically lower direct-current voltage that could be used by the control part 3 for controlling the motor 5. Although in this embodiment only one motor 5 is shown, it is nevertheless easily possible to control several motors together or independent of each other by means of the control part 3. An operation of the control is performed, for example, by means of the operating elements 41, 42, with this operation causing a control of the motor 5 by the control part 3.

The input connection 11 of the housing 1 is constructed, for example, as a conventional mains connection socket for common mains connection cables. Alternatively, however, a rigidly installed cable could be provided for the connection to the mains connection VAC. In a similar way, the motor or the motors could be connected to the control part 3 by means of a rigidly connected cable or alternatively by means of a special motor connection like output connection 12.

The operating part 4 that is constructed, in this embodiment, as a separate assembly connected to the control part 3 by means of an operating cable could also be integrated, in other embodiments, directly into the housing 1 or could be connected mechanically to the housing 1 such that the operating part 4 and the housing 1 form an integrated unit.

A switch-mode power supply 2 according to the present embodiment has a smaller structural size than a transformer of a conventional construction for a corresponding electrical power. Thus, the control with switch-mode power supply 2 and control part 3 could be installed, in a space saving way, in a smaller housing 1 than would be possible with conventional transformers. Consequently, such a control could also be mounted on an adjustable piece of furniture with lower expense with respect to assembly and production costs. In particular, in this case the control could be attached at ergonomically and/or visually more favorable positions of the piece of furniture.

The size of the switch-mode power supply 2 and thus the size of the entire control or the housing 1 of the control depend not only on the required maximum electrical power of the control, but also on a time component, in particular, a ratio between values according to experience for a load case and idle phases lying between load cases. For example, a switch-mode power supply 2 is designed for a loading of one minute with a subsequent idle phase of nine minutes. Alternatively, a switch-mode power supply 2 could be designed for a loading of two minutes with a subsequent idle phase of eighteen minutes. In the scope of such dimensioning, the structural size of the switch-mode power supply 2 could be further reduced in some circumstances. This is supported in that the switch-mode power supply 2 can be controlled in the idle phases by the ready signal into an idle operating state in which the switch-mode power supply and the entire control can be cooled, for example, in an improved way.

Figure 2:
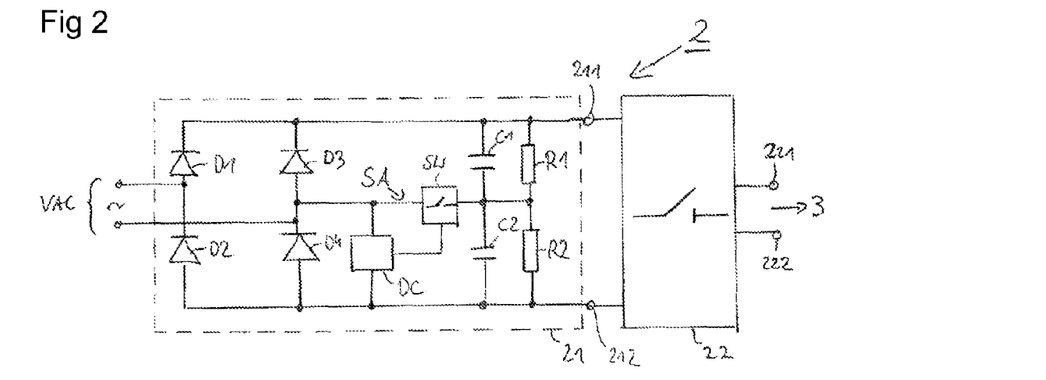
FIG. 2, shows an embodiment of a switch-mode power supply for a control according to the invention.

FIG. 2 shows an embodiment of a switch-mode power supply 2 that is suitable, for example, for use in a control according to the embodiment in FIG. 1. The switch-mode power supply 2 has a first stage 21 and a second stage 22. Here, the first stage 21 is connected on the input side to the mains connection VAC and on the output side to the second stage 22 by means of connections 211, 212. For an output 221, 222 of the second stage 22, a connection to the control part 3 is provided.

The first stage 21 of the switch-mode power supply 2 has four rectifier diodes D1, D2, D3, D4 that are connected like a bridge rectifier. In particular, a series circuit of the first and second diodes D1, D2 and also a series circuit of the third and fourth diodes D3, D4 are connected between the connections 211, 212. Furthermore, a series circuit of a first and a second capacitor C1, C2 is connected between the connections 211, 212. A first resistor R1 is arranged parallel to the first capacitor C1. In a similar way, a second resistor R2 is provided parallel to the second capacitor C2.

The first stage 21 furthermore has a switching means SA that comprises a detection and control unit DC and a switch SW. The detection and control unit DC is connected between a connection node of the third and fourth diodes D3, D4 and the second output connection 212. The switch SW connects the connection node between the third and fourth diodes D3, D4 to the connection node of the first and second capacitors C1, C2 or the first and second resistors R1, R2. A control of the switch SW is performed by means of the detection and control unit DC.

By means of the switch SW, in the first stage 21 a first or a second operating mode can be selected. For example, in the first operating mode, the switch SW is in an open position, so that no electrical connection exists between the nodes of the capacitors C1, C2 or resistors R1, R2 and the connection node of the diodes D3, D4. In this case, the circuit comprising the first stage 21 operates as a bridge rectifier with which the mains alternating-current voltage applied on the input side is converted into a direct-current voltage applied to the connections 211, 212 as intermediate voltage.

The capacitors C1, C2 are here used, in a known way, for storing electrical energy and for smoothing the prepared intermediate voltage. In order to be able to uniformly distribute a voltage drop across the capacitors C1, C2, by means of the resistors R1, R2, a potential equalization can be performed, which corresponds, with respect to circuitry, to, for example, one compensated capacitive voltage divider. Advantageously, the resistors R1, R2 have, for this purpose, identical or nearly identical resistance values. Furthermore, capacitance values of the capacitors C1, C2 are also advantageously approximately equal. The value of the output-side intermediate voltage on the connections 211, 212 is given, in a known way, from the voltage amplitude of the mains alternating-current voltage that is applied on the input side and equals, in European areas, approximately 400 V.

In the second operating mode, the switch SW is in a closed state, so that the connection node of the diodes D3, D4 is connected electrically to the connection node of the capacitors C1, C2 and to the connection node of the resistors R1, R2. In this way, a half-wave rectification is given with the diodes D1, D2 in which both the first and also the second capacitors C1, C2 are charged to the value of the voltage amplitude of the mains alternating-current voltage applied on the input side. The diodes D3, D4 are here operated in reverse direction. Accordingly, between the connections 211, 212, approximately a doubling of the voltage amplitude applied on the input side is produced across the capacitors C1, C2. For example, in the case of an effective mains alternating-current voltage of approximately 115 V applied on the input side, each of the capacitors C1, C2 is charged to a voltage value of circa 200 V. In this way, as the resulting direct-current voltage, an intermediate voltage of circa 400 V is produced between the connections 211, 212. This voltage thus corresponds essentially to the output direct-current voltage or intermediate voltage of the first stage in the first operating mode in the case of an effective input voltage of 230 V. Thus, for different voltage values of input alternating-current voltages, an approximately equal-size output direct-current voltage or intermediate voltage can be provided on the connections 211, 212.

In this embodiment, the detection and control unit DC is designed to evaluate a voltage value on the connection node of the third and fourth diodes D3, D4 and thus to detect a voltage range in which lies the mains alternating-current voltage applied on the input side. Alternatively or additionally, a voltage value on the connection node of the first and second diode D1, D2 could also be evaluated. As a function of this detection, the switch SW could be controlled in an open or in a closed state, wherein the circuit is operated in the first or in the second operating mode. For example, the decision whether the circuit is operated in the first or in the second operating mode is performed with reference to a threshold value or reference value that is exceeded or fallen below by the mains voltage.

The intermediate voltage provided by the first stage 21 is converted in the second stage 22 in the switched operation, expressed by the switch symbol of the second stage 22, into the voltage needed by the control part 3 on the connections 221, 222.

Figure 3:
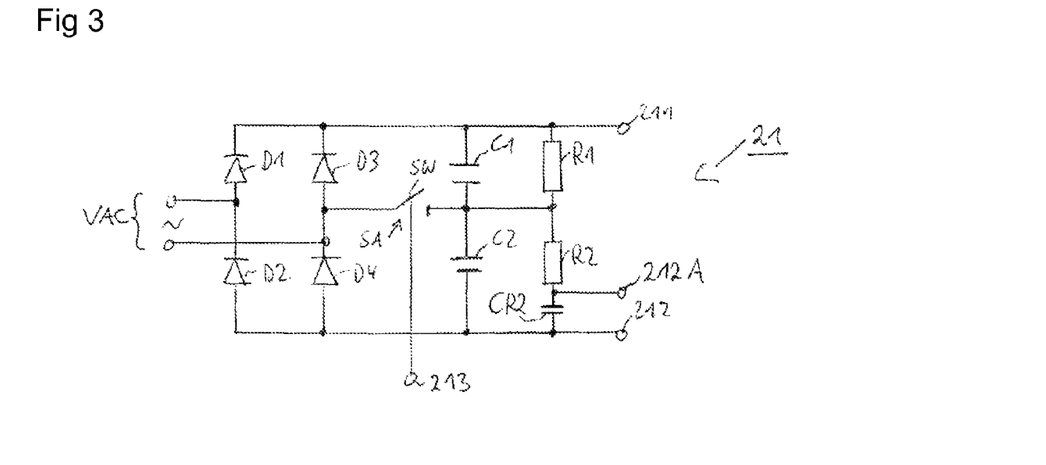
FIG. 3, shows a first embodiment of a first stage of the switch-mode power supply.

FIG. 3 shows an embodiment of a first stage 21 of a switch-mode power supply 2 that is used, for example, instead of the first stage 21 in FIG. 2. The first stage 21 in FIG. 3 has essentially the same elements as the first stage 21 shown in FIG. 2. Deviating from the embodiment shown in FIG. 2, a capacitor CR2 is provided between the resistor R2 and the connection 212, wherein a connection node of the capacitor CR2 and the resistor R2 forms an additional connection 212A.

The capacitor CR2 is charged by the resistor R2 in the operation of the arrangement by a balancing current. A voltage across the capacitor CR2 between the connections 212, 212A could be used as an auxiliary voltage for elements, for example, a controller, in the second stage 22. The capacitor CR2 here acts as an energy storage device. Advantageously, the voltage across the resistor R1 and the voltage across the series circuit made from resistor R2 and capacitor CR2 correspond to each other.

Furthermore, the switching means SA in FIG. 3 has, in contrast to FIG. 2, no detection and control unit DC, so that the switch SW is switched, for example, by means of a control signal applied on a control input 213. The switching between the first and the second operating mode thus can be performed by an externally provided control signal.

Alternatively, the switch SW could also be constructed as a manual switch or as a contact bridge, wherein, in this case, before the operation of the control, a corresponding setting of the switch SW is to be performed manually as a function of an available mains voltage. For example, before assembly or delivery of the control on an adjustable piece of furniture, the setting of the switch SW can be set rigidly with the knowledge of a mains alternating-current voltage present at the location of use of the control.

Figure 4:
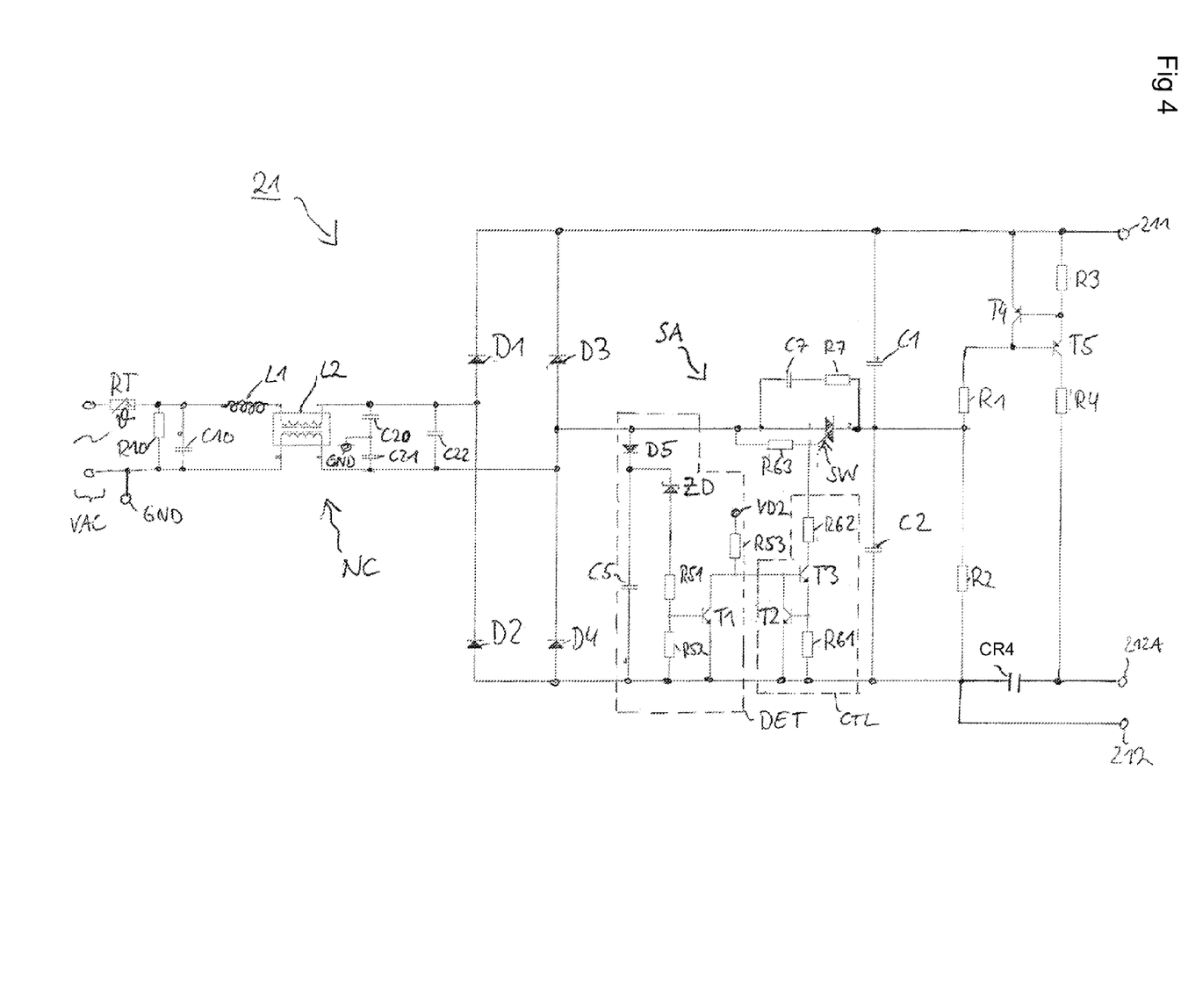
FIG. 4, shows a second embodiment of a first stage of a switch-mode power supply.

FIG. 4 shows another embodiment of a first stage 21 of a switch-mode power supply 2 that can be set in a control according to the embodiment in FIG. 1. In addition to the elements that are already known from the embodiments in FIGS. 2 and 3, in this embodiment, the first stage 21 has a mains coupling circuit NC that couples the diodes D1, D2, D3, D4 to the mains connection VAC. The mains coupling circuit NC here has a resistor R10, a capacitor C10, as well as capacitors C20, C21, and C22 that are connected between the mains connections. Furthermore, in the mains coupling circuit NC, a coil L1 and also a choke coil L2 are provided. In addition, a temperature-dependent resistor RT is arranged on the input side in the mains coupling circuit NC. A connection of the mains coupling circuit NC is connected to a reference potential connection GND. A connection node of the capacitors C20, C21 is likewise connected electrically to the reference potential connection GND.

Through the circuit elements R10, C10, C20, C21, C22, the electromagnetic compatibility or the EMV [EMC] of the present circuit can be improved. The resistor R10 is here used as a safety measure for discharging the capacitors C10, C20, C21, C22 when the stage 21 is separated from the mains voltage. This measure is supported by the choke coil L2 and the coil L1 that should realize essentially the reactions of the switched operation of the switch-mode power supply to the mains voltage through reduction of harmonic currents. The temperature-dependent resistor RT that advantageously has a negative temperature coefficient (NTC) is used for current limiting for the startup of the switch-mode power supply. During the operation of the switch-mode power supply, the influences of the temperature-dependent resistor RT that then has a very low resistance value can be neglected.

In this embodiment, the switching means SA has a detection device DET and a control device CTL that controls the switch SW constructed here as a triac. The detection device DET has a series circuit of a diode D5 and a capacitor C5 between the connection node of the diodes D3, D4 and the second output connection 212. The detection device DET also comprises a Zener diode ZD and resistors R51, R52 that are connected as a series circuit to the Zener diode ZD parallel to the capacitor C5. In addition, the detection device DET has a transistor T1 whose control connection is connected to a connection node of the resistors R51, R52 and whose controlled path is coupled to a supply connection VD2 between the second connection 212 and via a resistor R53.

The control circuit CTL has a second and a third transistor T2, T3 and also resistors R61, R62. Here, the resistor R62, the controlled path of the transistor T3, and the resistor R61 form a signal path between a control input of the switch SW and the second connection 212. The control connection of the transistor T3 is connected to the detection device DET and to the connection 212 via the controlled path of the transistor T2. A control connection of the transistor T2 is coupled to a connection node of the transistor T3 and the resistor R61. A series circuit of a resistor R7 and a capacitor C7 is provided parallel to the switch SW. Furthermore, the control connection of the switch SW is coupled to the connection node of the diodes D3, D4 by means of a resistor R63.

Deviating from the preceding embodiments, the resistor R1 is not connected directly to the first connection 211, but instead by means of a circuit formed by a transistor T4, a transistor T5, and a resistor R3. The controlled path of the transistor T5 is here coupled by means of a resistor R4 to an additional connection 212A. A capacitor CR4 between the connections 212, 212A is charged by the current through the resistor R4 and is used as an energy storage device. For example, different circuit parts could be provided with the voltage on the capacitor CR4. Furthermore, the voltage on the connection VD2 could be derived from the connection 212A.

In the detection device DET, the diode D5 and the capacitor C5 form a peak value rectifier. As a function of the Zener voltage of the Zener diode ZD, the transistor T1 can be controlled by means of a voltage divider formed by the resistors R51, R52. A current supply of the controlled path of the transistor T1 is performed, for example, by means of the supply connection VD2. In one of various embodiments, the voltage applied on the supply connection VD2 can be provided by a circuit part not shown here from the second stage 22 of the switch-mode power supply 2. Such a voltage does indeed not exist immediately after the activation or startup of the switch-mode power supply, but is typically set in a very short time, so that the supply of the transistor T1 is also guaranteed in this case.

Through the control circuit CTL, the signal provided by the detection device DET is converted into a control signal for controlling the switch SW. Here, however, no periodic control of the triac is performed, but instead a continuous actuation or provision of this switching element. The resistor R62 is here used as a protective resistor. The resistor R63 provides for a secure blocking of the triac in the deactivated state. Advantageously, the triac SW is triggered in the second or third quadrant with respect to its characteristic control line, which results in a lower trigger current and thus a lower control power. In other words, with the resistor R61 and the resistor R53, the transistor T3 forms a controlled current source for generating a control current for the switch SW. Through the use of a current source, lower losses are generated in the control of the triac.

The RC series circuit R7, C7 is used for the dU/dt [dV/dt] limit during a switchover process of the switch SW. If no mains voltage is applied or during an activation process, the triac SW is advantageously in a deactivated, that is, open state.

The elements R3, T4, T5 are used in connection with the resistor R4 for the balancing of the voltages across the capacitors C1, C2 and also during an activation process. They could also be replaced by a direct connection or a resistor-constructed connection of the resistor R1 to the connection 211.

With the embodiments shown in FIG. 4, a switch-mode power supply can be realized that can output an essentially equal intermediate voltage on the connections 211, 212 without requiring a manual action both in the case of mains voltages of circa 230 V in European areas and also of circa 115 V in North American areas, wherein this intermediate voltage can be converted by a second stage 22 into the direct-current voltage needed by a control part. Such a switch-mode power supply also distinguishes itself, in particular, through a resistance to short circuits, which is not given in the case of a conventional transformer. In addition, such a switch-mode power supply distinguishes itself through a lower weight with respect to a conventional transformer.

Figure 5:
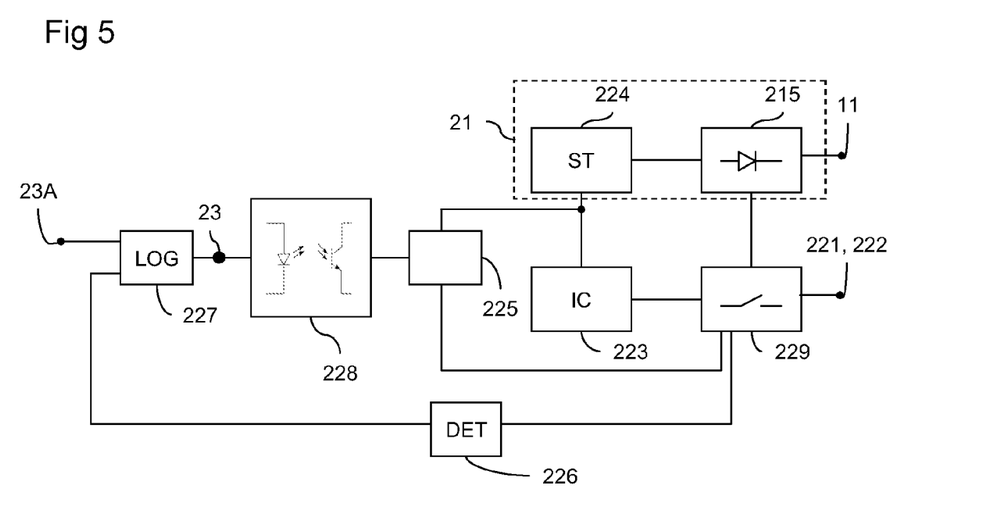
FIG. 5, shows a first construction detail of a switch-mode power supply.

FIG. 5 shows an embodiment of an example switch-mode power supply. In the block circuit diagram in FIG. 5, an optocoupler 228 that is connected on the input side via a logic element 227 to the control input 23 and a detection circuit 226 and on the output side to an operating supply circuit 225, a switch-mode regulator component 223, and the first stage 21 that comprises a startup circuit 224 and a rectifier block 215 are shown. The startup circuit 224 is connected on the input side to a connection of the rectifier block 215 of the first stage 21, which is coupled, as described above, electrically to a mains connection 11 for feeding the mains alternating-current voltage. With the help of the startup circuit 224, a supply voltage of lower power is provided for the switch-mode regulator component 223. Incidentally, the component 223 is supplied by a voltage that is derived by the operating supply circuit 225 from an auxiliary voltage in the switching means 229, wherein the supply can be turned on or off by means of the operating supply circuit as a function of a control by the optocoupler 228.

In regular operation, that is, a normal operating state or power operating state, the operating supply circuit 225 is controlled such that a continuous supply of the component 223 is performed. In this operating state, the component 223 controls the switching means 229 so that this generates, among other things, a direct-current voltage on the connections 221, 222 from the intermediate voltage provided by the first stage 21. A supply of the component 223 by the startup circuit 224 is not needed in this operating mode.

If the switch-mode power supply is to be controlled by a corresponding signal, for example, the ready signal on the input 23 into an idle operating state, the operating supply circuit 225 is controlled so that the component 223 is not supplied continuously, but instead draws its energy from the startup circuit 224. A control of the switching means 229 is possible in this operating state only over a limited time span, because the energy provided by the startup circuit 224 is not sufficient for a continuous switching operation of the component 223. A corresponding situation is provided if an elevated voltage in the switching means 229 is detected, for example, by the detection circuit 226.

For example, a control of the operating supply circuit 225 is performed by means of the logic element 227, the connection 23, and the optocoupler 228 when the ready signal is received on input 23A and/or is generated by the detection circuit 226 when an overvoltage in the switching means 229 is detected. The ready signal for controlling into the idle operating state can be generated by the control part 3, for example, in an idle phase. Due to the limited time span of the supply by the startup circuit 224, the component 223 operates in the idle operating state, in other words, in the clocked operation. This clocked operation functions with the help of the startup circuit 224 that can briefly start up the component 223 and stop it again after a short time when or because no supply of the component 223 is provided by means of operating supply circuit 225. The component 223 is thus periodically initialized and turned off again.

In contrast to a no-load operation in the power operating state in which no power is received merely by means of the direct-current voltage output on the output side, but nevertheless loss power is produced by switchover processes, in the case of a no-load operation in the idle operating state, the power consumption of the circuit arrangement is significantly reduced, because the mentioned switching losses do not occur. During the idle operating state, the switch-mode power supply does indeed output a voltage to the outside that is also sufficient, under some circumstances, for supplying electronics of the connected control part, but not its power part. In order to resume the normal operation or power operation, it is necessary that the switch-mode power supply 2 is activated again accordingly.

Thus, with the described idle operating state, the power requirement of the switch-mode power supply can be reduced so that, for example, certain legal environmental standards, such as, for example, the Green Label, can be fulfilled.

Figure 6:
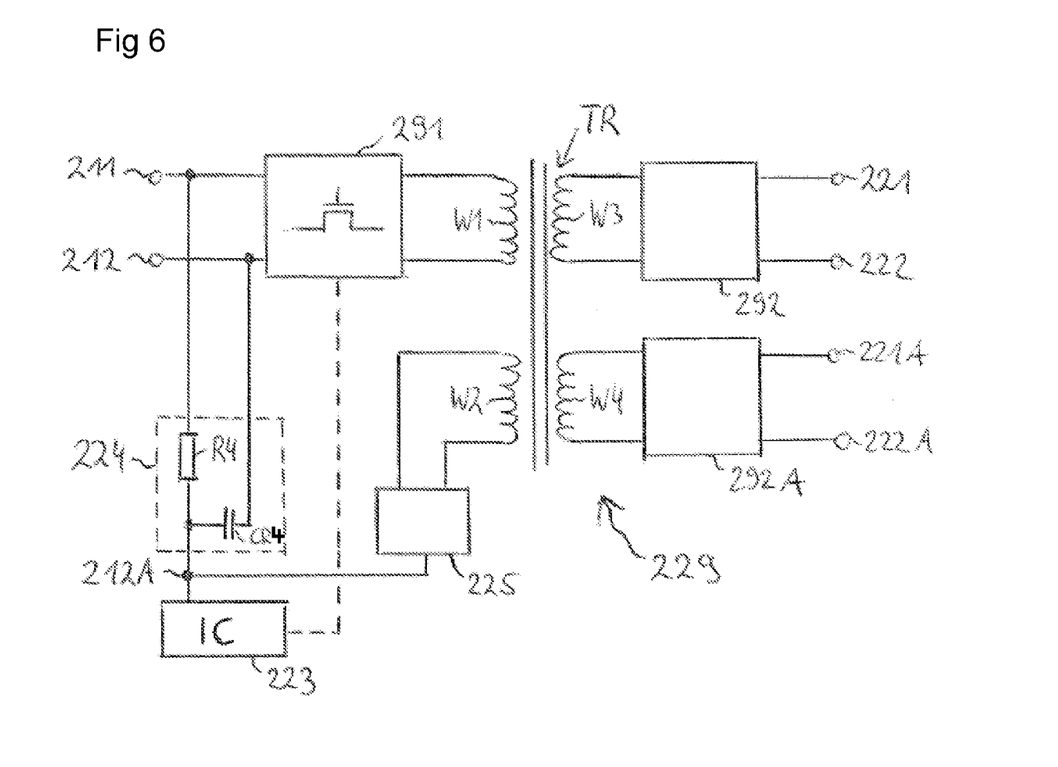
FIG. 6, shows a second construction detail of a switch-mode power supply.

FIG. 6 shows another construction detail from a switch-mode power supply. In the block circuit diagram in FIG. 6, a switch transistor block 291 that is connected on the input side to the connections 211, 212 and on the output side to a first winding W1 of a transformer TR, the startup circuit 224, the switch-mode regulator component 223, the operating supply circuit 225, and circuit blocks 292, 292a are shown. The operating supply circuit 225 is connected on the input side to windings W2 of the transformer TR. The windings W1, W2 represent a primary side of the transformer TR, while windings W3, W4 are arranged on the secondary side and are connected to the circuit blocks 292, 292a. An output of the operating supply circuit 225 is coupled on the connection 212A that is connected to a supply voltage input of the component 223. Furthermore, the startup circuit 224 is connected to the connection 212A, wherein this startup circuit comprises the resistor R4 that connects the connection 211 to the connection 212A and the capacitor CR4 that connects the connection 212 to the connection 212A. A control of the transistor switch in block 291 is performed by the switch-mode regulator component 223. With reference to FIG. 5, the transformer TR and the circuit elements 291, 292, 292a are comprised by the switching means 229.

In the idle operating state, the capacitor CR4 is charged by means of a current produced from the intermediate voltage on the connection 211 and the resistor R4. When a certain voltage value is reached in the capacitor CR4, the switch-mode regulator component 223 begins to initialize, in order to perform a switched operation or a control of the transistor switch in the switching transistor block 291. However, the current requirements of the component 223 are greater than the charging current through the resistor R4, so that it leads to a discharge of the capacitor CR4. Accordingly, if no voltage supply is also performed by means of the operating supply circuit 225, then the component 223 is deactivated again, and the capacitor CR4 is recharged. A control of the operating supply circuit 225 is performed, for example, in turn by an optocoupler 228 that is not shown here for reasons of clarity and can transmit a ready signal. In this way, a periodic charging and discharging of the capacitor CR4 or a periodic operation of the component 223 in the idle operating state is realized.

If the operating supply circuit 225 is switched into the normal operating state, however, then through initial switching processes in the switching transistor block 291, a current is generated in the winding W1, and a voltage is induced in the winding W2 that is used as an auxiliary voltage for the operating supply circuit 225 from which the supply voltage on the connection 212A can be derived. This voltage is sufficient for a continuous operation of the module 223 and thus of the switch-mode power supply. On the secondary side, accordingly, voltages are induced in the windings W3, W4 that are converted by the circuit parts 292, 292a into the direct-current voltage on the connections 221, 222 or an additional direct-current voltage on the connections 221a, 222a.

In the idle phase in the idle operating state, the transformer TR is essentially unloaded, so that the transformer TR that heats up in the normal operating state, for example, due to core losses, can cool completely. In this way, the transformer TR can be operated during normal operation with a relatively higher power. In other words, the transformer TR can be designed for a lower continuous load compared with a conventional switch-mode power supply. Through the idle operating state, however, not only the transformer, but also other components of the switch-mode power supply are subject to less thermal loading.

The transformer TR has, for example, windings with larger winding wire diameters, wherein the current load capacity of the transformer is increased. Simultaneously, however, lower numbers of windings could be provided in the transformer. Therefore, the transformer has a low inductance that causes a higher magnetization current and thus higher core losses that would be unfavorable for continuous operation. However, because the regulator does not operate during the charging time of the capacitor CR4 and therefore also no magnetization current flows, the higher core losses in comparison with a conventional transformer are justifiable or negligible due to the idle operating state. In other words, the transformer TR can cool sufficiently, however, due to the idle operating state. In the case of a conventional switch-mode power supply, namely a magnetization current also flows in the corresponding transformer when, in a secondary way, no current is drawn. In this case, the transformer would also heat up in the no-load operation.

In one embodiment of the transformer TR, a winding wire diameter of the transformer is increased by the parallel connection of several thin wires. This leads to an improved current distribution in the windings, because an individual wire with larger winding wire diameter would be loaded non-uniformly due to the current displacement at the typically occurring frequencies.

Figure 7:
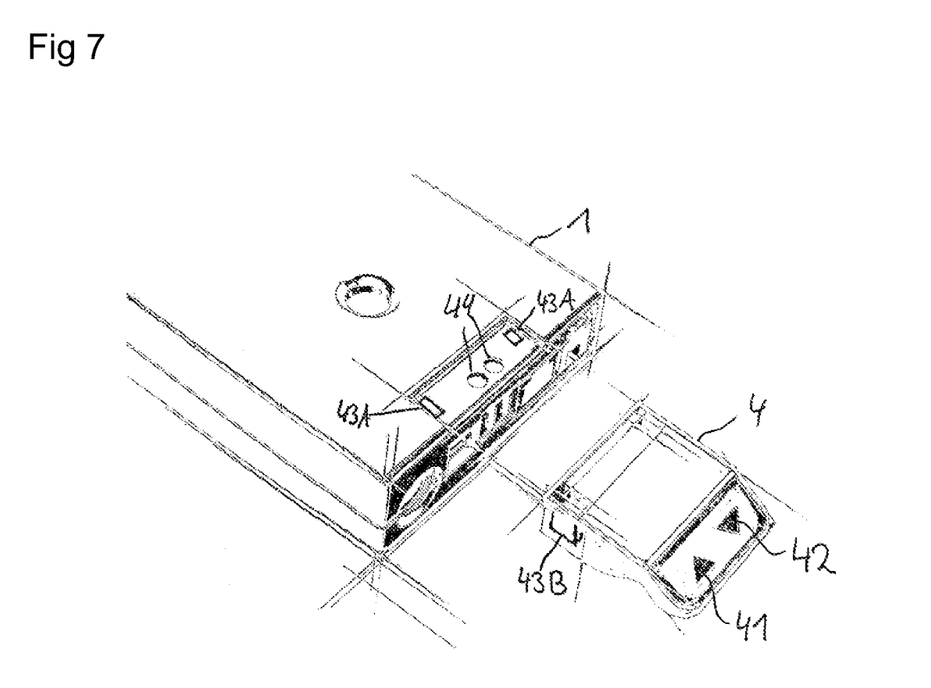
FIG. 7, shows an embodiment of a control with operating part that can be integrated.

FIG. 7 shows an embodiment of a housing 1 for a control according to one of the embodiments described above. An operating part 4 that, together with the housing 1, then forms an integrated unit can be attached to the housing 1. For example, the operating part 4 has parts of a snap connection 43B that can be locked in corresponding openings 43A of the housing 1.

A transmission of control commands that can be given by means of the operating elements 41, 42 can be performed, for example, purely mechanically through openings 44 in the housing 1. As an alternative to the snap connection 43A, 43B, the operating part 4 could also be attached to the housing 1 with a screw connection not shown here, in order to form an integrated unit.

Deviating from the way shown in FIG. 7, an operating part 4 could also be attached to the housing 1 at the top. For example, the operating part 4 could be attached from the top to the housing 1 with a corresponding snap connection or screw connection. In this case, a transmission of control commands could also be performed purely mechanically through openings in the housing 1.

In this way it is possible overall to attach a housing that can be constructed with small dimensions with respect to the construction due to the switch-mode power supply in a simple way to an adjustable desk underneath a desktop so that only the operating part integrated with the housing peeks out under the edge of the desk.

The invention claimed is:

1. A control module comprising:
    a housing;
    a control part that is designed to control an electrically adjustable piece of furniture; and
    a switch-mode power supply that supplies the control part, wherein the control part and the switch-mode power supply are integrated into the housing;
    wherein the switch-mode power supply has a first stage and a second stage, wherein the first stage is designed to generate an intermediate voltage from a mains voltage applied to the switch-mode power supply on an input side and wherein the second stage is designed to generate a direct-current voltage from the intermediate voltage with a switch-mode regulator component in a switched mode, wherein the direct-current voltage is fed to the control part for generating at least one output voltage of the control module;
    wherein the switch-mode power supply is designed to be switched into an idle operating state as a function of a ready signal;
    wherein the switch-mode power supply is designed to provide a supply voltage in a clocked manner for the switch-mode regulator component in the idle operating state by a start-up circuit that has an energy storage device and a resistance element and to provide a supply voltage continuously in a normal operating state by an operating supply circuit; and
    wherein the energy storage device and the resistance element are dimensioned such that, in the idle operating state, a time span for charging the energy storage device is greater than a time span for discharging the energy storage device by the switch-mode regulator component.

2. The control module according to claim 1, wherein the start-up circuit is designed to derive the supply voltage for the switch-mode regulator component from the intermediate voltage.

3. The control module according to claim 1, wherein the operating supply circuit is designed to derive the supply voltage for the switch-mode regulator component from an auxiliary voltage in the second stage.

4. The control module according to claim 1, wherein the operating supply circuit can be deactivated as a function of the ready signal.

5. The control module according to claim 4, wherein the ready signal can be fed to the operating supply circuit by an optocoupler.

6. The control module according to claim 1, wherein the ready signal is generated by the control part as a function of a load state and/or by the second stage as a function of a value of the direct-current voltage.

7. The control module according to claim 1, wherein the second stage comprises a transformer whose windings are designed for short-term loading.

8. The control module according to claim 1, wherein the first stage is designed to assume at least a first operating mode or a second operating mode and wherein the first stage comprises a switching element designed to effect a changeover between the first and the second operating mode, wherein, for the generation of the intermediate voltage in the first operating mode, a half-wave rectification is performed, and in the second operating mode, a full-wave rectification is performed.

9. The control module according to claim 8, wherein the switching element is designed for the changeover between the first and the second operating mode as a function of a voltage value of the mains voltage.

10. The control module according to claim 8, wherein the switching element comprises:
    a detection device designed to detect at least one voltage range of the mains voltage determined by a reference value;
    a control device designed to generate a control signal as a function of the at least one detected voltage range; and
    a switch designed to select an operating mode as a function of the control signal.

11. The control module according to claim 8, wherein a voltage supply of the switching element is realized by the second stage.

12. The control module according to claim 1, further comprising an operating part that forms, with the switch-mode power supply and the control part, an integrated unit and is mounted on the housing
    with a snap connection or a screw connection.

* * * * *

UNITED STATES PATENT AND TRADEMARK OFFICE
CERTIFICATE OF CORRECTION

PATENT NO. : 8,638,083 B2  Page 1 of 1
APPLICATION NO. : 13/127569
DATED : January 28, 2014
INVENTOR(S) : Koch et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 432 days.

Signed and Sealed this
Twenty-second Day of September, 2015

Michelle K. Lee
*Director of the United States Patent and Trademark Office*